Sept. 29, 1964   R. E. PINAULT ETAL   3,150,761
CONVEYOR TRANSFER DEVICE
Filed Dec. 7, 1962   4 Sheets-Sheet 3

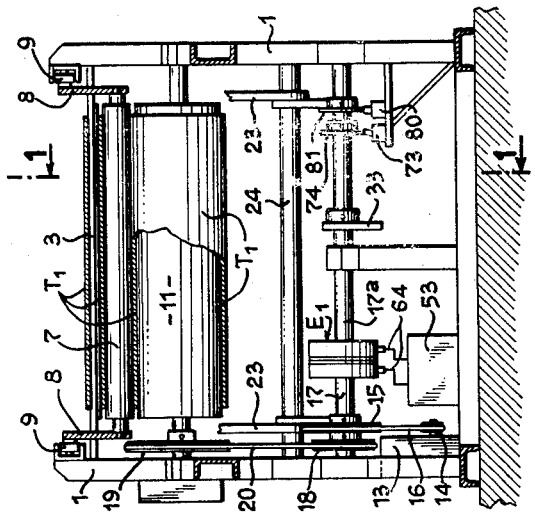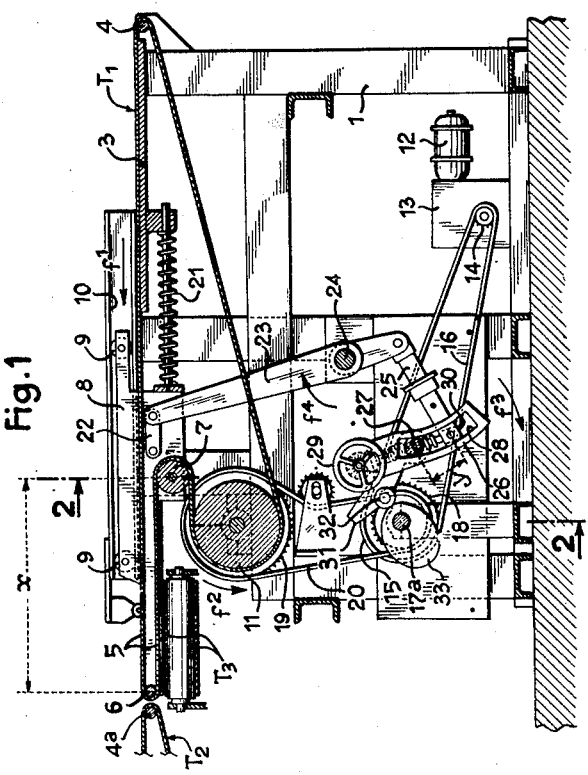

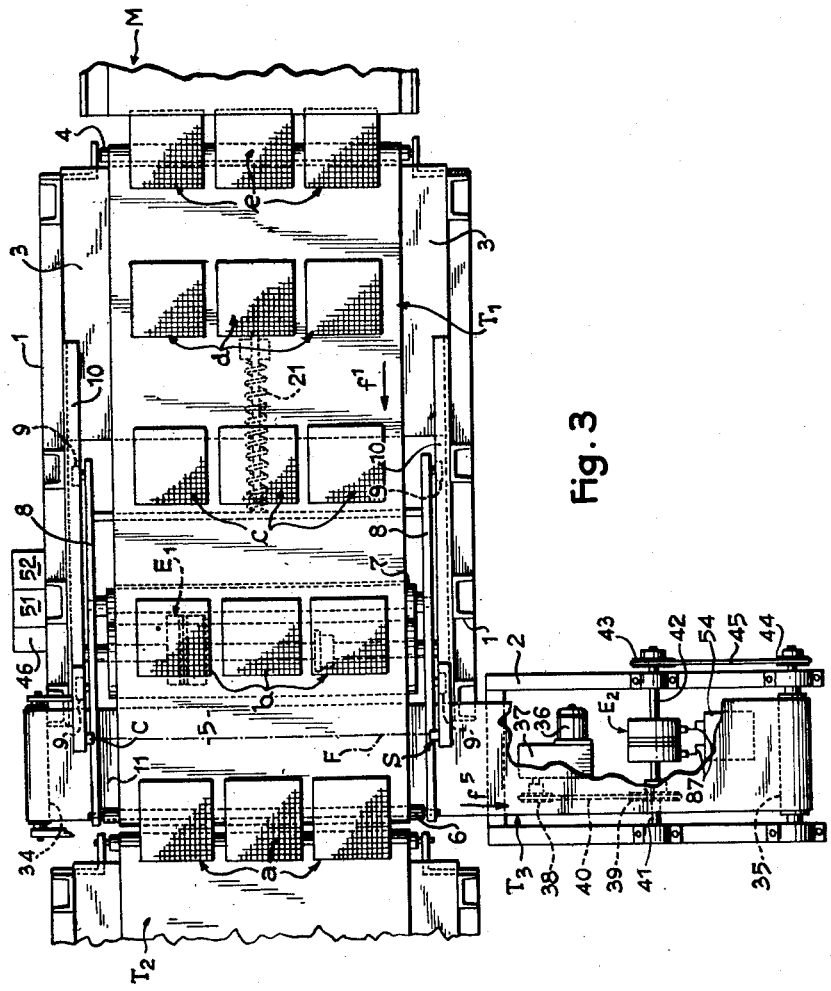

Fig.4ª 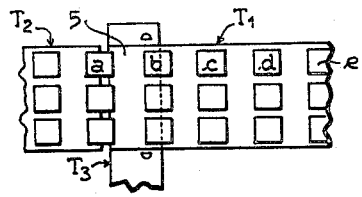

Fig.5ª 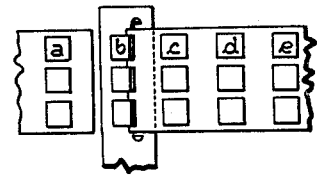

Fig.6ª 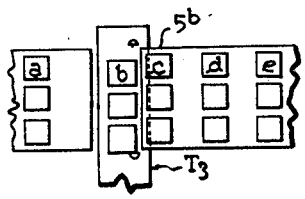

Fig.7ª 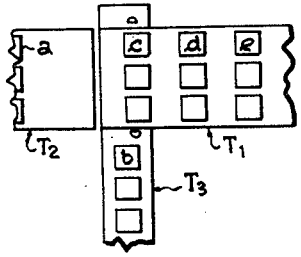

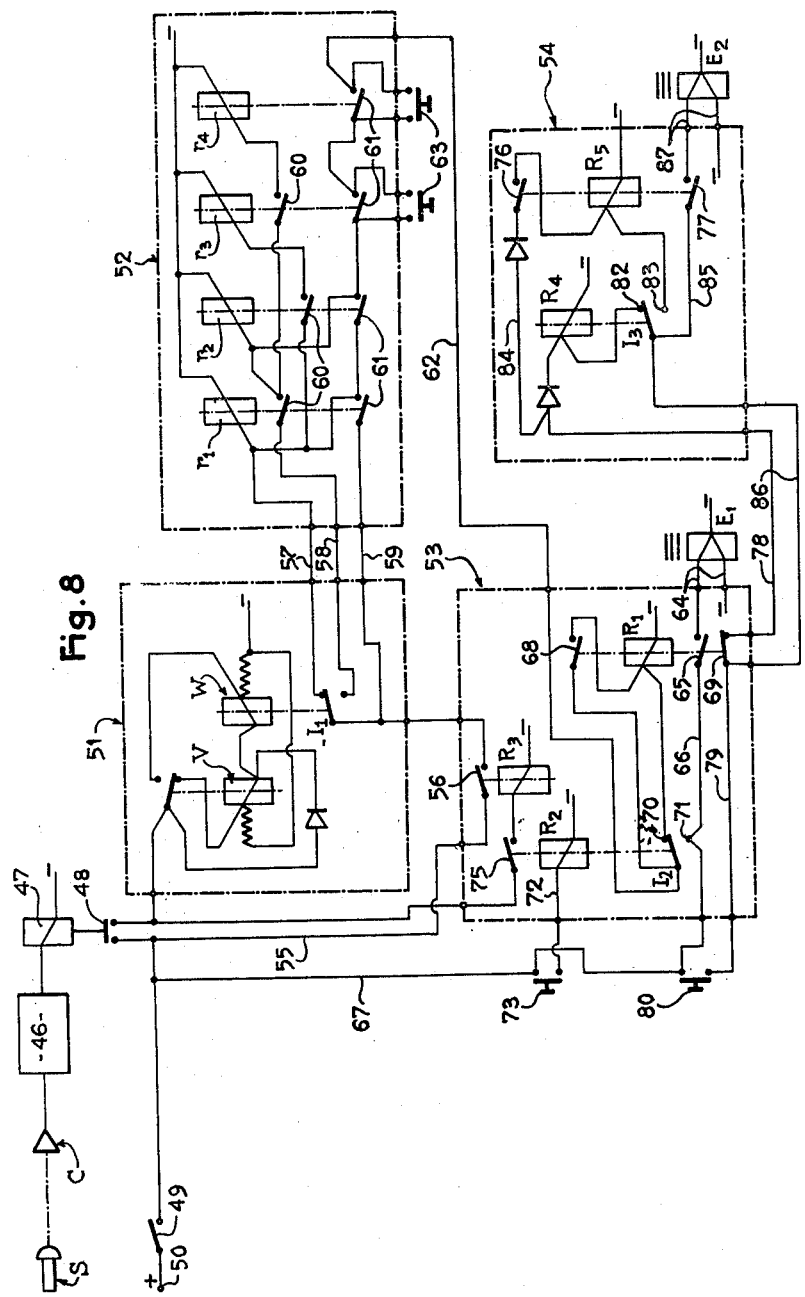

United States Patent Office 3,150,761
Patented Sept. 29, 1964

3,150,761
CONVEYOR TRANSFER DEVICE
René Etienne Pinault, Courbevoie, and Raymond
Edouard Maës, Bois-Colombes, France, assignors
to Anciens Etablissements A. Savy Jeanjean & Cie,
Courbevoie, France, a French corporation
Filed Dec. 7, 1962, Ser. No. 243,137
Claims priority, application France Dec. 8, 1961
8 Claims. (Cl. 198—31)

The present invention relates to the transfer of articles, such as slabs and sticks of chocolate, and any other articles and in particular moulded articles coming from a moulding machine, said articles being deposited on an endless "feed" conveyor at the upstream end of the latter relative to direction of motion, in transverse rows each of which comprises one or more articles, said conveyor being adapted to transfer or feed these articles at its downstream end to means for receiving and transporting these articles.

It has already been proposed to dispose at the downstream end of such a feed conveyor a depositing device whereby rows of articles are deposited on a second endless conveyor which is disposed transversely under said device and adapted to receive and convey the articles to a packing or conditioning station, for example to a folding and wrapping device. In this known arrangement the endless feed conveyor is of invariable length—for example of the type having chains and plates—which permits mechanically controlling in synchronism the depositing device and the mechanism driving the feed conveyor on condition that the rows of articles placed transversely of this conveyor are spaced a constant distance apart.

However, this control is no longer possible should the rows of articles be spaced unequal distances apart owing to a deposit of the articles at irregular intervals or owing to variations in the length in the upper portion of the conveyor which could occur in the band or belt type of conveyor and which affects said spacing in the course of conveyance.

The object of the present invention is to provide an improved transfer device for articles supplied in rows, said device overcoming the foregoing disadvantages and distributing the articles in two different directions in accordance with a given rhythm or cycle.

The improved device according to the invention comprises in combination a continuously driven endless longitudinal feed conveyor which comprises a band or belt and is provided at its downstream end, relative to the direction of motion of the conveyor, with a depositing nose which is retractable from an extended downstream position to a retracted upstream position; receiving means located longitudinally of the conveyor and following on the nose; a transverse conveyor-receiver located transversely of and under the nose so as to be uncovered when the nose is retracted; two drive means having electromagnetic clutch and brake units for respectively driving the nose and the transverse conveyor; a photoelectric cell and a source of light disposed transversely of the above feed conveyor so that the light beam impinging on the cell is intersected successively by each row of articles; and electromagnetic means controlled by the cell for simultaneously engaging every $n$ occultations of the light beam, the clutch of said drive means of the nose whose clutch is normally disengaged so as to retract the nose and disengaging the clutch of said drive means of the transverse conveyor whose clutch is normally engaged.

Owing to this combination, irrespective of the spacing between the rows of articles received by the feed conveyor and conveyed from its upstream and to its downstream end; it is certain that every $n$ rows the depositing nose will be retracted in the upstream direction so as to permit the transfer of this $n$th row of articles onto said transverse conveyor whereas the $(n-1)$ other rows will pass, through the medium of the depositing nose in its normal downstream position in which it forms a bridge over the transverse conveyor, onto said receiving means disposed longitudinally of and following on the feed conveyor.

Said receiving means can be formed by handling slabs or plates, or preferably by a continuously driven second longitudinal conveyor which, in receiving the $(n-1)$ rows at its upstream end conveys them at its downstream end either directly to a second conditioning or packing station or, through the medium of a second depositing nose, to a second transverse conveyor and a second longitudinal receiving means, said second depositing nose being arranged with a cell for transferring to a second transverse conveyor one of the $(n-1)$ rows; the $(n-2)$ remaining rows passing onto the second receiving means; and so on; if desired.

Another object of the invention is to provide a machine for conveying articles comprising at least one transfer device of the aforementioned improved type.

Further features and advantages of the invention will be apparent from the ensuing description; with reference to the accompanying drawings to which the invention is in no way limited.

In the drawings:

FIG. 1 is a vertical longitudinal sectional view, taken along line 1—1 of FIG. 2, of a transfer device according to the invention;

FIG. 2 is a vertical cross-sectional view, taken along line 2—2 of FIG. 1;

FIG. 3 is a plan view thereof;

FIGS. 4 and 4a are a vertical longitudinal sectional view and a plan view respectively of the transfer device in a position in which the rows of articles of the feed conveyor pass onto a longitudinal lower conveyor;

FIGS. 5 and 5a are views similar to FIGS. 4 and 4a showing the feeding of a row of articles onto the transverse conveyor owing to retraction of the depositing nose in the upstream direction;

FIGS. 6 and 6a are views similar to FIGS. 4 and 4a at the end of the retraction of the nose;

FIGS. 7 and 7a are views similar to FIGS. 4 and 4a the nose having returned to its active position, and FIG. 8 is a diagram of the various connections interconnecting the electromagnetic devices controlling the retractable nose and the transverse conveyor.

I. DESCRIPTION OF THE DEVICE

(A) Mechanical Part

Figure 4:
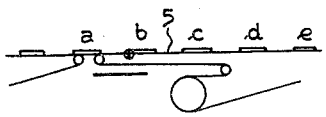

With reference to FIG. 3 which clearly shows the arrangement of the transfer device and the function it is intended to perform, this device comprises a longitudinal feed conveyor $T_1$ having an endless band or belt driven continuously or intermittently (depending on the production rate) located at the outlet of a manufacturing machine; for example a moulding machine which moulds for example articles which are flat-shaped and relatively thin such as slabs or sticks of chocolate or other material. These articles are supplied by the machine M to the conveyor $T_1$ in successive transverse rows $a, b \ldots$ which could be equally spaced apart. Thus, in FIG. 3, the distance between the rows $a$ and $b$ is greater than that between the rows $b$, $c$ and $d$ which are spaced substantially an equal distance apart; and the articles of the row $e$ just supplied by the machine M are nearer to the articles of row $d$.

These rows of articles must be deposited either onto a handling device, following on and located on the same level as, the conveyor $T_1$, this device being for example an endless conveyor band or belt $T_2$, as illustrated, or any other receiving and conveying means such as slabs, plates, trays or other elements; or onto a transverse conveyor $T_3$ located on a lower level to the conveyor $T_1$ below the downstream end of the latter relative to the direction of movement (arrow $f^1$) of the articles carried by the conveyor $T_1$ (see FIGS. 1 and 3).

The transfer device must permit depositing one row of articles onto the conveyor $T_3$ every $n$ rows of articles, the value $n$ being at least equal to 2, a row of articles being deposited on the longitudinal conveyor $T_2$ or the like every $n-1$ rows.

The machine comprises two rigid stands 1 and 2 disposed at right angles to each other. The stand 1 comprises at its upper part and toward the upstream end of the conveyor (relative to the direction of movement of the articles) a table 3 over which passes the upstream portion of the upper reach of the flexible belt forming the conveyor $T_1$; this belt extending round a small freely rotative roller 4. At the downstream end, the conveyor $T_1$ forms at 5 a depositing nose or distributor which is restrictable in the upstream direction. This nose comprises in the known manner a portion of the conveyor belt passing round two rollers 6 and 7 which are simultaneously movable in the downstream direction and then in the upstream direction, without changing the distance $x$ (FIG. 1) between the axes of the rollers owing to the fact that the journals of these rollers 6 and 7 are carried by a rigid carriage 8 which rolls through the medium of rollers 9 in runways 10 provided on the stand 1.

The conveyor belt $T_1$ remains taut owing to the fact that when the two portions of the belt leading to the roller 6 decrease in length, the two portions passing round the roller 7 increase in length to the same extent.

Between the rollers 7 and 4 the belt of the conveyor $T_1$ extends round a driving drum 11 driven in continuous rotation in the direction of arrow $f^2$ (FIG. 1). This drum is driven by an electric motor 12 through the medium of a speed-reducer 13, a first transmission having sprocket wheels 14 and 15 and a chain 16, a countershaft 17, and a second transmission including sprocket wheels 18 and 19 and a chain 20.

The carriage 8 undergoes a reciprocating motion, the travel in the downstream direction causing the extension to the normal position of the retractable nose 5 and the upstream travel causing the retraction of the nose. This reciprocating motion is imparted to the carriage 8, in opposition to the action of elastically yieldable means 21 which tend to bias the nose to the normal downstream extended position, by a drive device driven by the shaft 17. Thus, the carriage 8 is connected by a link 22 (FIG. 1) to a lever 23 mounted on the stand 1 for pivotal movement about a fixed pin 24. This lever is connected by a link 25 to an arcuate lever 26 which is mounted for pivotal movement about a fixed pin 27 carried by the stand 1. The point at which the link 25 is pivoted to the lever 26 is adjustable in a slot 28 in the lever 26 by means of a control wheel 29 which permits shifting the pivot block 30, the adjustment of the distance $y$ (FIG. 1) is a function of the mean distance between the successive rows of articles on the conveyor $T_1$. The lever 26 is rigid, as concerns its pivotal movements, with an arm 31 carrying a roller 32 which, under the effect of the spring 21 acting on the carriage 8, is constantly maintained in contact with the peripheral face of a cam 33. This cam is keyed on a driven shaft 17$a$ which an electromagnetic clutch and brake unit $E_1$ permits coupling to the coaxial driving shaft 17.

As will be understood, each time that the clutch and brake unit $E_1$ is excited, the shaft 17$a$ participates in the rotation of the shaft 17 and the cam 33, in exerting a force on the arm 31, causes the lever 26 to pivot about the pin 27 in the direction of arrow $f^3$ and this causes the lever 23 to pivot about the pin 24 in the direction of arrow $f^4$ and exert a traction through the medium of the link 22 on the carriage 8 in the upstream direction (relative to the direction of movement of the articles carried by the conveyor $T_1$) and retract the depositing nose 5.

If the conveyor $T_2$ is used, as illustrated, instead of any other supporting and evacuating device, it is constructed preferably in the same manner as the conveyor $T_1$. The upstream roller 4$a$ of this conveyor is shown in FIG. 1.

The transverse conveyor $T_3$ is constituted by an endless band or belt held taut between a roller 34 carried by the stand 1 and a drum 35 carried by the stand 2 at the end thereof remote from the stand 1. The roller 34 and drum 35 are disposed on such levels that the upper portion of the conveyor $T_3$ passes in the vicinity of, but below, the lower portion—held taut between the rollers 6 and 7—of the retractable depositing nose 5.

The conveyor belt $T_3$ is driven intermittently in such manner that its upper portion travels in the direction of arrow $f^5$ (FIG. 3) by an electric motor 36 which drives a driving shaft 41 (FIG. 3) through the medium of a speed-reducer 37 and a transmission having sprocket wheels 38, 39 and a chain 40. This driving shaft 41 is connected by another electromagnetic clutch and brake unit $E_2$ having a coaxial shaft 42 which drives the drum 35 through the medium of a transmission having sprocket wheels 43 and 44 and a chain 45.

Located on a level slightly higher than that of the upper portion or reach of the depositing nose 5 and in facing relation to one another and on each side of this nose are a photoelectric cell C and a source of light S producing a light beam F which extends transversely over the nose 5 at a height from its upper portion which is less than the thickness of the articles $a$, $b$, $c$ . . . Thus, when one of the rows of articles is located on the nose 5 between the cell C and the source S, the beam F is intersected and the cell is occultated from the light. The successive occultations of the cell are employed, in accordance with the invention, for controlling the excitations of the clutch and brake units $E_1$ and $E_2$ in such manner that for every $n$ occultations the clutch and brake unit $E_1$ is engaged (it being normally disengaged) so as to cause a to-and-fro travel of the depositing nose from the extended downstream position to the retracted upstream position whereas the clutch and brake unit $E_2$, which is normally engaged, is disengaged, owing to provision of auxiliary means only, during the retraction travel of the depositing nose 5 from the downstream position to the upstream position.

The electromagnetic part of the transfer device combined with the cell C will now be described.

(B) *Electromagnetic Part*

FIG. 8 shows the source S producing the light beam F which impinges on the cell C and the clutch and brake units $E_1$ and $E_2$. In this FIG. 8 the various switches and reversing switches are disposed in the position they occupy when the depositing nose 5 is in its extended downstream position.

The photoelectric cell C is connected in the conventional manner to an amplifier 46 which supplies an electromagnetic relay 47 actuating a switch 48 which is normally open but is closed each time that the cell gives a current impulse, that is, for each occultation of this cell by a row of articles passing in front of this cell. The switch 48 is connected in series with a main hand switch 49—closed when the machine operates—in the supply circuit, from a source of current having a positive terminal 50, of a device 51 adapted to supply an impulse to a memory unit 52 for each occultation of the cell. The unit 52 is so adapted that after the recording of $n$ impulses it transmits an electric impulse to a control unit 53 actuating the clutch and brake unit $E_1$ in the direction for clutch engagement, this engagement resulting in the de-excitation of the clutch $E_2$ through the medium of another unit 54.

In the illustrated embodiment the device 51 is constituted by an electromagnetic flip-flop having two relays V and W which are connected to constitute a flip-flop and act on a reversing switch $I_1$ so that its moving element changes position for each occultation of the cell C. The moving element of this reversing switch is connected to the positive terminal 50 by a conductor 55 through a zero-setting switch 56 in the unit 53 (see hereinafter) and the switch 49. Further, this moving element and the two contact studs of the reversing switch $I_1$ are connected by three conductors 57, 58, 59 to the memory unit 52.

In the presently-described embodiment, this unit 52 is of the electromagnetic type having as many relays $r_1$, $r_2$, $r_3$, $r_4$ as there are $n$ rows of articles in a transfer cycle. Each of the first $(n-1)$ relays comprises a switch 60 which excites the following relay and each of these $n$ relays comprises a main control switch 61 which moreover maintains the excitation as soon as the exciting impulse has ceased. When they are all closed, the main switches 61 connect the conductor 59, and consequently the source of current 50, to a conductor 62 controlling the unit 53 which therefore receives a control impulse from the source 50 through the switch 49, the conductor 55, the zero-setting switch 56, considered to be closed, the conductor 59, the switches 61 and the conductor 62.

It will be observed that the number of relays $r_1$, $r_2$ ... to be excited can be easily regulated or arranged to be less than the maximum $n$ by providing means for a short-circuiting one or more of the switches 61. These means have been diagrammatically shown in FIG. 8 in the form of simple switches 63. Consequently, depending on the regulation, for every $n$ $(n-1)$, $(n-2)$, occultations a current impulse is sent to the unit 53 controlling the depositing nose 5. This unit is shown in FIG. 2 where it is connected to the electromagnetic clutch and brake unit $E_1$ by two conductors 64 (FIGS. 2 and 8).

In the unit 53 there are provided three relays: a control relay $R_1$, an auxiliary relay $R_2$ and a zero-setting relay $R_3$, actuating the switch 56.

The relay $R_1$ controls three switches, the switch 65 inserted in the supply circuit 66 of the electromagnetic unit $E_1$, this circuit 66 being connected by the conductor 67 to the positive terminal 50 through the switch 49; the switch 68 which connects the coil of the relay $R_1$ to the moving element of a reversing switch $I_2$; and the switch 69 controlling the unit 54.

The switches 65 and 68 are open when the relay $R_1$ is unexcited whereas the switch 69 is closed.

The reversing switch $I_2$ is controlled by the relay $R_2$. Its contact is connected to the coil of the relay $R_1$ whereas its other contact 71 is connected to the line 67 by the conductor 66 and its moving element is connected, on the one hand, to the conductor 62 leading to the memory unit 52 and, on the other hand, to the switch 68.

The coil of the auxiliary relay $R_2$ is connected to the positive terminal of the source of current by a conductor 72 through a contactor 73. This contactor 73 (FIG. 2) is actuated by a cam 74 keyed on the driven shaft 17a so that this contactor is closed when the depositing nose 5 is in the extended position and is automatically opened so long as the shaft 17a rotates, that is, so long as the depositing nose moves firstly in the upstream direction and then in the downstream direction.

The zero-setting relay $R_3$ controls the switch 56 in such manner that the latter is opened when the relay is excited. Its excitation circuit is connected to the positive terminal of the source through the switch 75 controlled, at the same time as the reversing switch $I_2$, by the relay $R_2$ in such manner that this switch 75 is open when the relay $R_2$ is excited through the switch 48.

The unit 54 controlling the clutch and brake unit $E_2$ will now be described. This unit 54 comprises an auxiliary relay $R_4$ controlling a reversing switch $I_3$ and an auxiliary relay $R_5$ controlling two switches 76 and 77.

The coil of the relay $R_4$ is connected to the positive terminal of the source of current by a conductor 78, the switch 69 of the relay $R_1$ of the unit 53, another conductor 79 and a switch 80 which, being normally closed, is opened at the end of the retracting movement of the depositing nose 5 under the effect of a cam 81 (FIG. 2) keyed on the driven shaft 17a.

When the relay $R_4$ is excited the reversing switch $I_3$ is closed on its contact stud 82 which maintains the excitation of this relay whereas when it is de-excited the switch is closed on the other contact stud 83.

The relay $R_5$ is excited, on the one hand, through the reversing switch $I_3$ by the stud 83 and, on the other hand, by the closing of the switch 76 connected to the positive terminal by the conductors 84, 78, 79 through the switches 69, 80 and 49.

The coil of the clutch and brake unit $E_2$ is connected by the conductors to the positive terminal through the switch 77, and the conductors 85, 86 and 79. The switches 76 and 77 are closed when this relay $R_5$ is excited.

II. OPERATION OF THE TRANSFER DEVICE.

As will be understood, the machine M supplies successive rows of articles, such as rows $a$, $b$, $c$, $d$, $e$, to the conveyor $T_1$ while the latter is driven in the direction of arrow $f^1$ in a permanently continuous manner or intermittently depending on how the machine M operates, as soon as the motor 12 is supplied with current, this motor driving the drum 11 in the direction of arrow $f^2$. At each passage of a row of articles in front of the cell C the beam F is interrupted and this results in an occultation of this cell and consequently a momentary closure of the switch 48. For each occultation the flip-flop 51 therefore sends an impulse to the memory unit 52 which records the $n$ successive impulses by the excitation of its relays one after the other.

Initially (FIGS. 4 and 4a), the depositing nose 5 is assumed to be extended in its normal downstream position. The contact 73 (FIGS. 2 and 8) is closed and the auxiliary relay $R_2$ is excited. The reversing switch $I_2$ is on the contact stud 70.

The memory unit 52 has not yet recorded $n$ impulses if the switches 63 are open or $(n-1)$ impulses if one of these switches is closed $(n-2)$ impulses if the two switches 63 are closed, and consequently there is no current in the conductor 62. Therefore the relay $R_1$ which is then connected to the conductor 62 by the stud 70, is not excited. The switches 65 and 68 are consequently open and the unit $E_1$ is not excited. The driven shaft 17a is stationary and the nose 5 is stationary in its extended downstream position.

Simultaneously, as the relay $R_1$ is unexcited, the switch 69 is closed and, as is the case with the switch 80 which will only be opened at the end of the upstream retraction of the depositing nose 5, the relay $R_4$ is excited through its contact 82 in the same way as the relay $R_5$ through its switch 76.

The switch 77 is therefore closed and consequently the clutch and brake unit $E_2$ is excited. The conveyor $T_3$ is thus driven in the direction of the arrow $f^5$ (FIG. 3). At the moment when the memory unit 52 records the passage of the $n$th, the $(n-1)$th, or the $(n-2)$th row of articles (depending on the positions of the switches 63, that is, the row of articles which must pass onto the conveyor $T_3$, this memory unit sends a current impulse through the conductor 62. This current passes through the contact stud 70 and excites the control relay $R_1$ whose switches 65 and 68 close, while the switch 69 controlling the unit 84 opens.

Upon closure of the switch 65 the current arrives in the clutch unit $E_1$ and this results in the driving of the auxiliary shaft 17a and consequently the driving-through cam 33, the lever 26, the link 25, the lever 23 and the link 22 of the depositing nose 5, or more exactly its carriage, in the upstream direction. The nose 5, therefore starts its retraction movement.

So long as the impulse remains in the conductor 62, the relay $R_1$ remains excited through the stud 70. But as soon as the nose starts to move it opens the end-of-travel contactor 73 which opens the supply circuit of the auxiliary relay $R_2$ and this moves the moving element of the reversing switch $I_2$ onto the stud 71. The control relay $R_1$ is now maintained operative through the closed switch 68, the reversing switch $I_2$ and the conductor 67.

It is the relay $R_2$ which makes the impulse disappear in the conductor 62. When the supply of this relay is cut off by the opening of the end-of-travel contactor 73 the switch 75 closes and excites the zero-setting relay $R_3$. Its switch 56 opens and cancels out both the impulse in the conductor 62 and the counting effected by the memory unit 52 which is returned to zero.

The action of the relay $R_1$ and that of the clutch and brake unit $E_1$ are maintained so long as the depositing nose 5 has not returned to its initial position. As soon as this nose reaches this initial position it once more closes the contactor 73 and this excites the relay $R_2$. The moving element of the reversing switch $I_2$ returns to the stud 70 but at this moment there is no current in the conductor 62, the relay $R_1$ is no longer excited, and the opening of the switch 65 cuts off the supply of the clutch and brake unit $E_1$ and this stops the depositing nose 5 in its normal extended downstream position.

As concerns the clutch and brake unit $E_2$, that is, the operation or stopping of the conveyor $T_3$, it will be recalled that this clutch is normally excited by the closure of the switches 69 and 80 and the resultant excitation of the relays $R_4$ and $R_5$.

Figure 5:
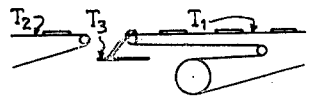

As soon as the main relay $R_1$ is excited, that is, at the moment when the memory unit 52 produces, after having counted $n$ rows of articles, a current impulse in the conductor 62, this relay $R_1$ opens the switch 69 and this causes the de-excitation of the relay $R_5$ through its switch 76. This relay $R_5$ consequently opens the switch 77, cuts off the supply of the clutch and brake unit $E_2$ and stops operation of the transverse conveyor $T_3$. This conveyor will remain stationary during the deposit of the $n$th row of articles thereon by the upstream retraction of the depositing nose 5 which is in process of terminating its retraction travel (see the position shown in FIGS. 5 and 5a). A row $b$ of articles is in process of progressively falling onto this conveyor $T_3$ while the preceding row $a$ is carried along by the conveyor $T_2$ which had previously received this row (FIGS. 4 and 4a).

Figure 6:
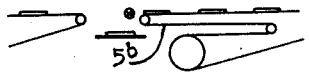
Figure 7:

FIGS. 6 and 6a show the row $b$ of articles received on the conveyor $T_3$ and already conveyed a certain distance by the latter while the depositing nose 5 reaches the end of its retraction travel at 5b. At this moment the shaft 17a opens the contactor 80 through the medium of the cam 81 and this cuts off the supply of the relay $R_4$ which returns the moving element of the reversing switch $I_3$ to the contact stud 83. But as the shaft 17a continues to be driven by the clutch and brake unit $E_1$ which remains temporarily excited as has been mentioned hereinbefore, the depositing nose starts its return travel toward the extended downstream position and the cam 81 closes the contactor 80 which opened for only a very short period. The relay $R_5$ is then again supplied with current through this contactor 80 and the reversing switch $I_3$. The switches 76 and 77 are closed and the electromagnetic clutch and brake unit $E_2$ is again excited through the switch 77. The transverse conveyor $T_3$ once more operates in order to carry away the articles $b$ it received. (FIGS. 6, 6a, and 7, 7a.)

When the depositing nose 5 has reached its normal extended position (FIGS. 7, 7a), the relay $R_1$ once again closes the switch 69 which supplies current to the relay $R_4$, and the latter returns the reversing switch $I_3$ to the contact stud 82.

The initial situation is thus resumed and one transfer cycle of the transfer device has finished. The depositiing nose 5 will remain in its extended position with the clutch and brake unit $E_1$ unexcited while the conveyor $T_3$ will remain in motion, the clutch and brake unit $E_2$ being excited, during the passage of a further $(n-1)$ rows of articles in front of the light beam F, the $n$th occultation of the cell C again resuling in the deposit of the $n$th row of articles on the conveyor $T_3$ which will remain temporarily stationary in order to receive this row, and so on.

Although a specific embodiment of the invention has been defined, many modifications and changes may be made therein without departing from the scope of the invention as defined in the appended claims.

Having now described our invention what we claim as new and desire to secure by Letters Patent is:

1. Transfer device for transferring articles of chocolate or other articles, comprising in combination: a continuously driven endless longitudinal feed conveyor which comprises a band or belt and is provided at its downstream end, relative to the direction of motion of the conveyor, with a depositing nose which is retractable from an extended downstream position to a retracted upstream position; receiving means located longitudinally of the conveyor and following on the nose; a transverse conveyor-receiver located transversely of and under the nose so as to be uncovered when the nose is retracted; two drive means having electromagnetic clutch and brake units for respectively driving the nose and the transverse conveyor; a photoelectric cell and a source of light disposed transversely of and above the feed conveyor so that the light beam impinging on the cell is intersected successively by each row of articles; and electromagnetic means controlled by the cell for simultaneously engaging, every $n$ occultations of the light beam, the clutch of said drive means of the nose whose clutch is normally disengaged so as to retract the nose, and disengaging the clutch of said drive means of the transverse conveyor whose clutch is normally engaged.

2. Device as claimed in claim 1, wherein each of the two drive means comprises a driving shaft and a driven shaft interconnected by its corresponding electromagnetic clutch and brake unit, the driving shafts being driven continuously whereas the first of said driven shafts is connected to a carriage carrying the retractable depositing nose and the second of said driven shafts is connected to a driving drum of the transverse conveyor.

3. Device as claimed in claim 2, wherein the first driven shaft is connected to the carriage by a device comprising a cam and lever, said lever being of adjustable length so as to be adjustable to the mean distance between the successive rows of articles.

4. Device as claimed in claim 1, wherein the photoelectric cell supplies, through the medium of an electromagnetic flip-flop or like means, an electromagnetic memory unit or the like which, every $n$ impulses, causes through the medium of electromagnetic means the excitation of the clutch and brake unit of the drive means for the depositing nose and de-excitation of the clutch and brake unit of the drive means of the transverse conveyor.

5. Device as claimed in claim 4, wherein the electromagnetic means comprises an auxiliary relay whose excitation results in the transmission of the impulse produced by the memory unit to a control relay whose excitation insures the excitation of the electromagnetic clutch and brake unit of the drive means of the carriage carrying the depositing nose and the de-excitation of the clutch and brake unit of the drive means of the transverse conveyor, two contactors controlled by the driven shaft driving the carriage insuring their closure, the first of said contactors, the excitation of said auxiliary relay when the nose is in its extended normal downstream position and, the second of said contactors in combination with two other auxiliary relays, the re-excitation of the clutch and brake unit of the drive means of the transverse conveyor as soon as the nose has reached the end of its retraction travel, a zero-setting fifth relay setting the memory unit to zero after the memory unit has produced an electric impulse.

6. Device as claimed in claim 5, wherein the control relay, which controls by its excitation the supply of the clutch and brake unit of the drive means of the nose and the de-excitation of the clutch and brake unit of the drive means of the transverse conveyor, is supplied with current through a reversing switch controlled by the auxiliary relay supplied through the first contactor which is closed when the nose is extended in its normal downstream position and opened as soon as the nose starts its retraction, this reversing switch connecting the control relay to the memory unit when the auxiliary relay is excited and to a maintenance circuit when said auxiliary relay is de-excited.

7. Device as claimed in claim 5, wherein the excitation circuit of the zero-setting relay comprises a switch which is controlled by the auxiliary relay so as to be closed when this auxiliary relay is de-excited.

8. Device as claimed in claim 4 comprising means for regulating the memory unit so that it produces an electric impulse after a number of occultations of the cell equal to the value $n$ or a lower value, as desired.

References Cited in the file of this patent
UNITED STATES PATENTS
3,106,280 Baker _____ Oct. 8, 1963